(12) United States Patent
Kruckenberg

(10) Patent No.: US 11,066,147 B2
(45) Date of Patent: *Jul. 20, 2021

(54) STRUCTURED PANEL WITH INTEGRATED SKIN AND SIDEWALLS

(71) Applicant: Rohr, Inc., Chula Vista, CA (US)

(72) Inventor: Teresa Kruckenberg, La Mesa, CA (US)

(73) Assignee: Rohr, Inc., Chula Vista, CA (US)

( * ) Notice: Subject to any disclaimer, the term of this patent is extended or adjusted under 35 U.S.C. 154(b) by 472 days.

This patent is subject to a terminal disclaimer.

(21) Appl. No.: 16/031,397

(22) Filed: Jul. 10, 2018

(65) Prior Publication Data

US 2020/0017189 A1    Jan. 16, 2020

(51) Int. Cl.
| | |
|---|---|
| *B64C 1/40* | (2006.01) |
| *G10K 11/168* | (2006.01) |
| *G10K 11/172* | (2006.01) |
| *B32B 3/26* | (2006.01) |

(52) U.S. Cl.
CPC .............. *B64C 1/40* (2013.01); *G10K 11/168* (2013.01); *G10K 11/172* (2013.01); *B32B 3/266* (2013.01); *B32B 2307/102* (2013.01); *B32B 2605/18* (2013.01)

(58) Field of Classification Search
CPC ...... B64C 1/40; G10K 11/172; G10K 11/168; B32B 3/266; B32B 2307/102; B32B 2605/18
USPC ........................................................ 181/290
See application file for complete search history.

(56) References Cited

U.S. PATENT DOCUMENTS

| | | | |
|---|---|---|---|
| 3,734,234 A | 5/1973 | Wirt | |
| 7,051,489 B1 | 5/2006 | Swiszcz | |
| 9,704,467 B1 | 7/2017 | Nampy | |
| 10,316,755 B2 * | 6/2019 | Biset | F02C 7/24 |
| 2007/0278035 A1 * | 12/2007 | Mitchell | B63H 21/16 |
| | | | 181/290 |
| 2008/0020188 A1 | 1/2008 | Gale | |

(Continued)

FOREIGN PATENT DOCUMENTS

| | | | |
|---|---|---|---|
| CN | 104175616 | 6/2016 | |
| EP | 2844463 A1 * | 3/2015 | B64D 33/06 |

(Continued)

OTHER PUBLICATIONS

EP search report for EP19185521.2 dated Oct. 25, 2019.

*Primary Examiner* — Forrest M Phillips
(74) *Attorney, Agent, or Firm* — Getz Balich LLC

(57) ABSTRACT

A panel includes a core between and connected to a first skin and a second skin. The core includes a corrugated body, a first sidewall and a second sidewall. The corrugated body includes a plurality of corrugations configured from at least a plurality of baffles and a plurality of septums. Each of the corrugations includes a respective one of the baffles and a respective one of the septums. A first cavity extends laterally within the core from a first of the baffles to a first of the septums. The first cavity extends longitudinally within the core from the first sidewall to the second sidewall. The first cavity is fluidly coupled with a passage through a first portion of the first skin. The first portion of the first skin, the first sidewall and the second sidewall are collectively at least partially formed by a ply of material.

20 Claims, 13 Drawing Sheets

(56) References Cited

U.S. PATENT DOCUMENTS

| | | | |
|---|---|---|---|
| 2012/0285767 A1* | 11/2012 | Meyer | E04B 1/8209 |
| | | | 181/286 |
| 2015/0292413 A1* | 10/2015 | Soria | F02C 7/24 |
| | | | 181/290 |
| 2016/0012811 A1* | 1/2016 | Yamagiwa | B60N 3/048 |
| | | | 181/290 |
| 2016/0090735 A1* | 3/2016 | Geislinger | E04B 1/84 |
| | | | 181/290 |
| 2016/0201317 A1* | 7/2016 | Liou | E04B 1/8209 |
| | | | 181/290 |
| 2017/0301334 A1 | 10/2017 | Nampy | |
| 2018/0142621 A1 | 5/2018 | Biset et al. | |
| 2018/0142622 A1 | 5/2018 | Biset | |
| 2019/0147843 A1* | 5/2019 | Fairgrieve | B32B 5/32 |
| | | | 181/290 |

FOREIGN PATENT DOCUMENTS

| | | |
|---|---|---|
| GB | 2550926 | 12/2017 |
| JP | 5151535 | 2/2013 |
| WO | 2014200499 | 12/2014 |

* cited by examiner

STRUCTURED PANEL WITH INTEGRATED SKIN AND SIDEWALLS

BACKGROUND

1. Technical Field

This disclosure relates to structured panels such as, but not limited to, an acoustic panel for attenuating sound generated by an aircraft propulsion system.

2. Background Information

Structured panels such as acoustic panels may be used in various applications to attenuate noise. An acoustic panel, for example, may be configured with a nacelle of an aircraft propulsion system to attenuate noise generated by a gas turbine engine. Such an acoustic panel typically includes a honeycomb core connected between a perforated face skin and a solid, non-perforated back skin. The honeycomb core includes a plurality of resonating chambers. These resonating chambers are tuned by selecting a desired chamber length and, thus, core thickness that corresponds to a specific target frequency of noise to be attenuated. Increasing the core thickness, for example, will typically tune the resonating chambers for attenuating lower frequency noise. Conversely, decreasing the core thickness will typically tune the resonating chambers to attenuate higher frequency noise.

Recent trends in aircraft engine design such as higher bypass ratios, larger fan diameters, slower rotating fans and/or fewer number of fan blades have resulted in those aircraft engines generating relatively low frequency noise. Relatively strict space constraints (e.g., loft envelope) for those engines, however, typically limit or prohibit increasing the thickness of an acoustic panel to tune its resonating chambers for such relatively low frequency noise. There is a need in the art therefore for an acoustic panel operable to attenuate relatively low frequency noise while utilizing the same or less space than previous acoustic panels. There is a further need to provide a panel configuration capable of reducing panel assembly time, complexity and cost.

SUMMARY OF THE DISCLOSURE

According to an aspect of the present disclosure, a panel is provided for attenuating sound. This panel includes a first skin, a second skin and a core between and connected to the first skin and the second skin. The core includes a corrugated body, a first sidewall and a second sidewall. The corrugated body includes a plurality of corrugations configured from at least a plurality of baffles and a plurality of septums. Each of the corrugations includes a respective one of the baffles and a respective one of the septums. A first cavity extends laterally within the core from a first of the baffles to a first of the septums. The first cavity extends longitudinally within the core from the first sidewall to the second sidewall. The first cavity is fluidly coupled with a passage through a first portion of the first skin. The first portion of the first skin, the first sidewall and the second sidewall are collectively at least partially formed by a ply of material.

According to another aspect of the present disclosure, a structured panel is provided that includes a first skin, a second skin and a core between and connected to the first skin and the second skin. The core includes a corrugated body, a first sidewall, a second sidewall and a third sidewall. The corrugated body includes a plurality of corrugations configured from at least a plurality of baffles and a plurality of septums. Each of the corrugations includes a respective one of the baffles and a respective one of the porous septums. A first cavity extends laterally within the core from a first of the baffles to a first of the septums. The first cavity extends longitudinally within the core from the first sidewall to the second sidewall. A second cavity extends laterally within the core from a second of the baffles to a second of the septums. The second cavity extends longitudinally within the core from the second sidewall to the third sidewall. A first portion of the first skin adjacent the first cavity, a second portion of the first skin adjacent the second cavity, the first sidewall, the second sidewall and the third sidewall are collectively at least partially formed by a ply of material.

According to still another aspect of the present disclosure, a method is provided during which a panel is formed for attenuating sound. The panel includes a porous first skin, a second skin and a cellular core connected to and between the porous first skin and the second skin. The cellular core is configured with a first cavity that extends laterally between a baffle and a porous septum and longitudinally between a first sidewall and a second sidewall. A sheet of material is provided with one or more rows of polygonal cutouts. The sheet of material is folded such that a portion of the porous first skin bounding the first cavity, the first sidewall and the second sidewall are collectively at least partially defined by the folded sheet of material.

The first cavity may be fluidly coupled with a first passage through the first portion of the first skin. The second cavity may be fluidly coupled with a second passage through the second portion of the first skin.

The first skin may be a non-perforated skin.

The ply of material may be configured from or otherwise include thermoplastic material.

The ply of material may be configured from or otherwise include thermoset material.

The ply of material may be configured from or otherwise include metal.

The ply of material may be configured from or otherwise include fiber-reinforcement within a matrix.

The first portion of the first skin may be further partially formed by a second ply of material that overlaps and is bonded to the ply of material.

The ply of material may be configured with a first through hole. The second ply of material may be configured with a second through hole having a width that is greater than a width of the first through hole. The passage may be formed by at least the first through hole and the second through hole.

The core may further include a third sidewall. A second cavity may extend laterally within the core from a second of the baffles to a second of the septums. The second cavity may extend longitudinally within the core from the first sidewall to the third sidewall. The second cavity may be fluidly coupled with a second passage through a second portion of the first skin. The first portion of the first skin, the second portion of the first skin, the first sidewall, the second sidewall and the third sidewall may be collectively at least partially formed by the ply of material.

A second cavity may extend laterally within the core from a second of the baffles to a second of the septums. The second cavity may extend longitudinally within the core from the first sidewall to the second sidewall. The second cavity may be fluidly coupled with a second passage through a second portion of the first skin. The first portion of the first skin, the second portion of the first skin, the first sidewall and the second sidewall may collectively at least partially be formed by the ply of material.

The core may further include a third sidewall and a fourth sidewall. The corrugated body may be between the first sidewall and the third sidewall and between the second sidewall and the fourth sidewall. A second cavity may extend laterally within the core from the first of the septums to a second of the baffles. The second cavity may extend longitudinally within the core from the third sidewall to the fourth sidewall. The second cavity may be fluidly coupled with the first cavity through one or more perforations in the first of the septums.

A first portion of the second skin bounding the second cavity, the third sidewall and the fourth sidewall may collectively at least partially be formed by a second ply of material.

The third sidewall may be longitudinally aligned with the first sidewall. The fourth sidewall may be longitudinally aligned with the second sidewall.

The first sidewall and the second sidewall may each extend from the first skin to the first of the baffles and the first of the septums.

A first portion of the ply of material may overlap and may be bonded to a second portion of the ply of material to form at least a portion of the first sidewall.

A third portion of the ply of material may overlap and may be bonded to a fourth portion of the ply of material to form at least a portion of the second sidewall.

Prior to formation of the panel, the ply of material may be configured as or otherwise include a sheet of material with one or more rows of polygonal-shaped cutouts.

The ply of material may be configured as or otherwise include a plurality of segments. Each of the segments may include a rectangular base, a plurality of first triangular projections and a plurality of second triangular projections. The first triangular projections may be on a first side of the rectangular base. The second triangular projections may be on a second side of the rectangular base. Peaks of the first triangular projections of a first of the segments may be respectively connected to peaks of the second triangular projections of a second of the segments.

The foregoing features and the operation of the invention will become more apparent in light of the following description and the accompanying drawings.

DETAILED DESCRIPTION

Figure 1:
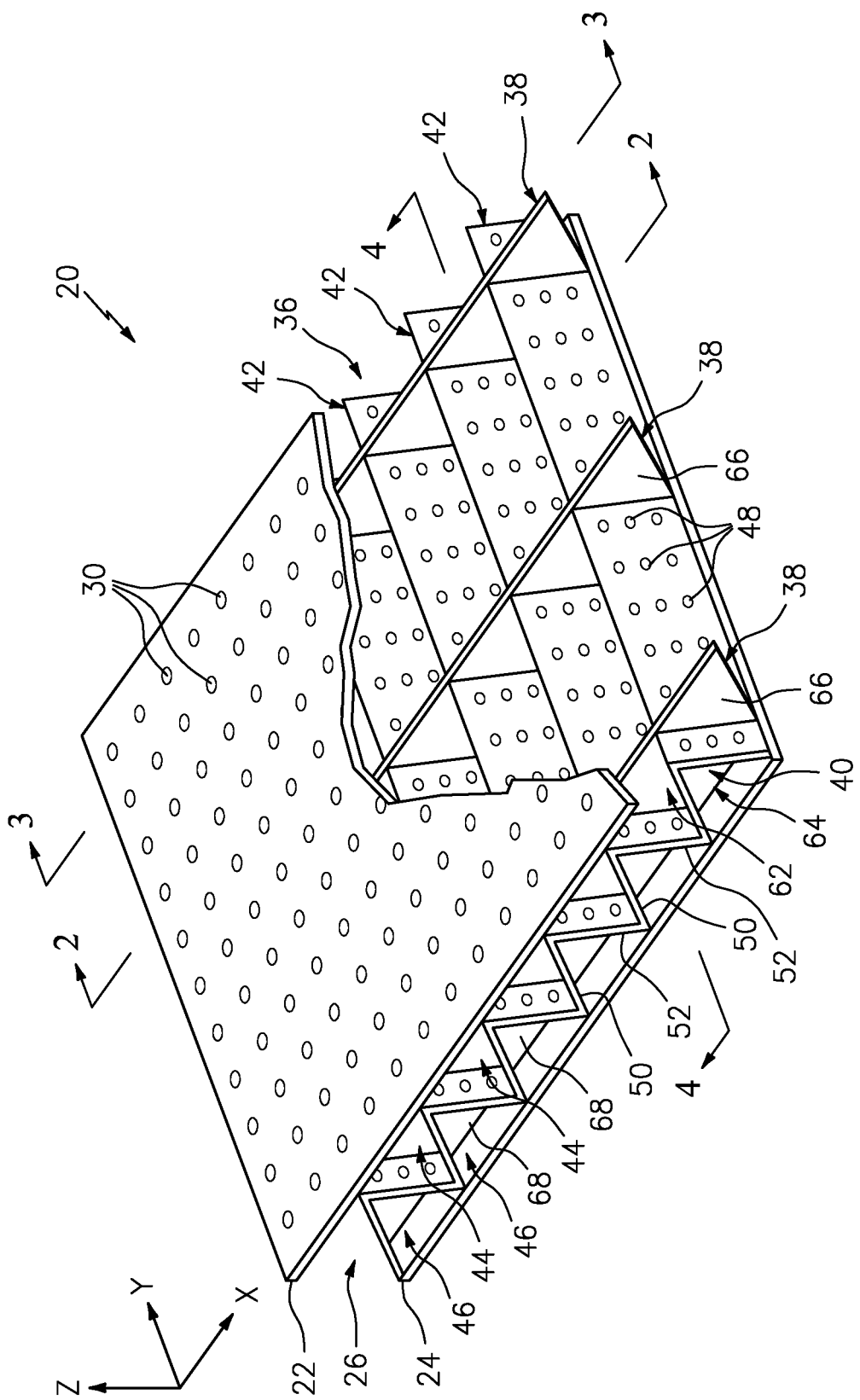
FIG. 1 is a cutaway perspective illustration of a portion of a structured panel, in accordance with various embodiments.

FIG. 1 is a cutaway perspective illustration of a portion of a structured panel 20; e.g., a structural acoustic panel. This structured panel 20 may be configured to attenuate sound (e.g., noise) generated by an aircraft propulsion system such as, for example, a turbofan propulsion system or a turbojet propulsion system. With such a configuration, the structured panel 20 may be configured with a nacelle of the propulsion system. The structured panel 20, for example, may be configured as or with an inner or outer barrel, a translating sleeve of a thrust reverser, a blocker door, etc. Alternatively, the structured panel 20 may be configured with another component/structure of the aircraft such as its fuselage or a wing. Furthermore, the structured panel 20 may be configured to also or alternatively attenuate aircraft related sound other than that generated by the propulsion system. The structured panel 20 of the present disclosure, however, may alternatively be configured for non-aircraft applications. Furthermore, the structured panel 20 may also be configured for non-sound attenuation applications.

The structured panel 20 of FIG. 1 extends longitudinally along a y-axis. The structured panel 20 extends laterally along an x-axis. The structured panel 20 extends vertically along a z-axis. The term "vertical" is used herein to describe a depthwise panel direction and is not limited to a gravitational up/down direction. Furthermore, for ease of illustration, the x-y plane is shown as a generally flat plane. However, in other embodiments, the x-y plane and, thus, the structured panel 20 may be curved and/or follow an undulating geometry. For example, the x-y plane and, thus, the structured panel 20 may be arcuate, cylindrical or conical with or without radial undulations. Thus, the vertical direction may change at different locations along the x-y plane;

e.g., the vertical direction may be a radial direction for a cylindrical, conical or spherical structured panel.

The structured panel 20 includes a (e.g., acoustic) porous top skin 22 (e.g., a perforated face skin), a solid, non-perforated bottom skin 24 (e.g., a back skin) and a cellular core 26. Note, the terms "top" and "bottom" are used in this disclosure to describe the relative position of an element as viewed in the figures. The present disclosure, however, is not limited to such an orientation. Furthermore, it is worth noting, the top skin 22 may be replaced with a solid, non-perforated skin where, for example, the structured panel 20 is not being used for sound attenuation.

Briefly, the cellular core 26 is disposed and extends vertically between the top skin 22 and the bottom skin 24. The cellular core 26 is also connected to the top skin 22 and the bottom skin 24. The cellular core 26, for example, may be welded, brazed, fused, adhered and/or otherwise bonded to or integral with the top skin 22 and/or the bottom skin 24 as discussed below in further detail.

Figure 2:
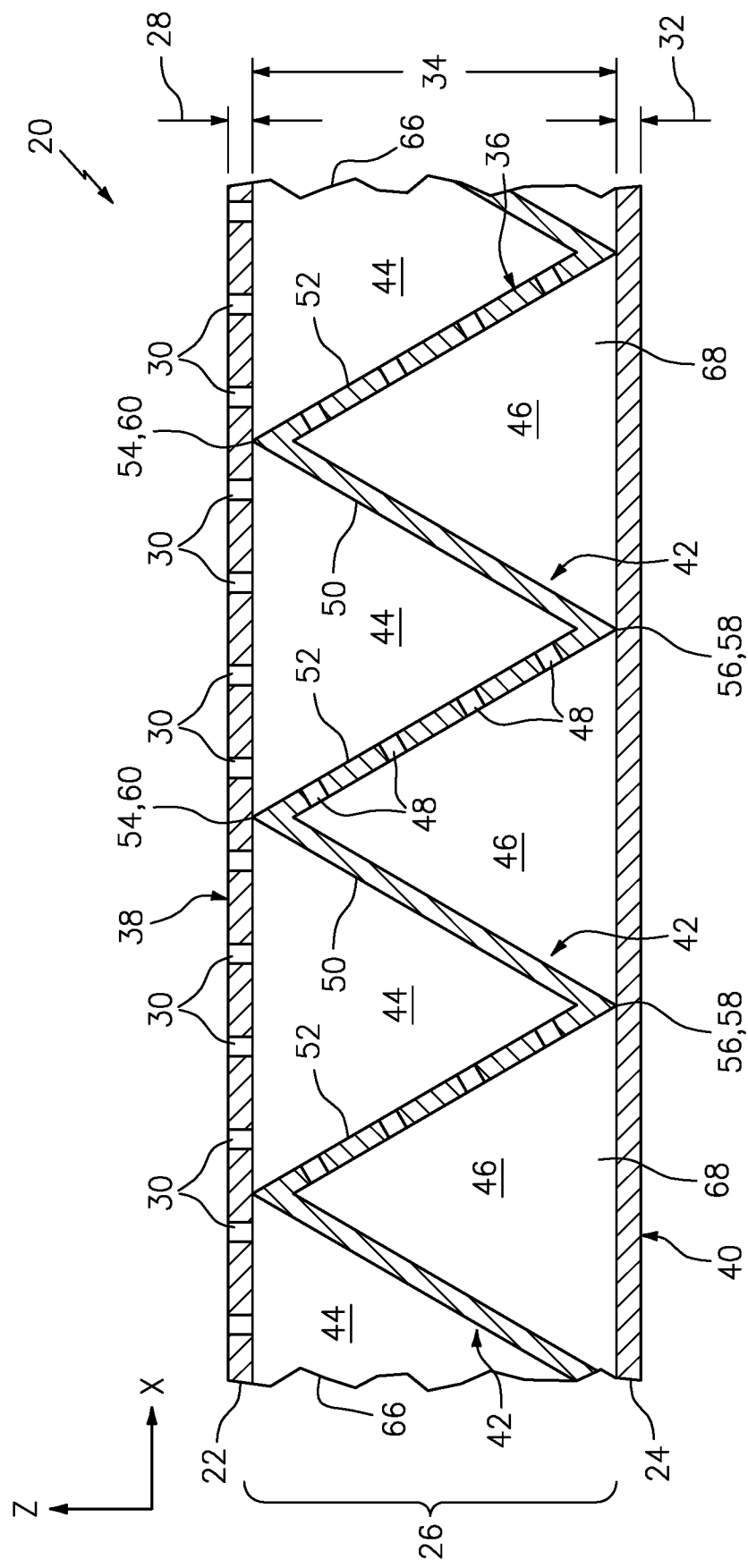
FIG. 2 is a sectional illustration of the structured panel portion of FIG. 1 along line 2-2, in accordance with various embodiments.

The top skin 22 of FIG. 1 is configured as a relatively thin sheet or layer of material that extends longitudinally and laterally along the x-y plane. This top skin material may include, but is not limited to, a metal (e.g., sheet metal), a polymer (e.g., thermoplastic or thermoset material), a fiber reinforced composite (e.g., fiberglass composite, carbon fiber composite, aramid fiber composite, etc.), or a combination thereof. Referring now to FIG. 2, the top skin 22 has a vertical thickness 28, which extends vertically between opposing first skin top and bottom side surfaces. The top skin 22 includes a plurality of passages 30; e.g., perforations such as through-holes. Each of these passages 30 extends generally vertically through the top skin 22 between its side surfaces. While the passages 30 are described above and illustrated in FIG. 2 as through-holes for ease of description, one or more of the passages may also or alternatively be formed by one or more interconnected pores in the top skin material in alternative embodiments.

The bottom skin 24 of FIG. 1 is configured as a relatively thin sheet or layer of (e.g., solid, continuous and/or uninterrupted) material that extends longitudinally and laterally along the x-y plane. This bottom skin material may include, but is not limited to, a metal (e.g., sheet metal), a polymer (e.g., thermoplastic or thermoset material), a fiber reinforced composite (e.g., fiberglass composite, carbon fiber composite, aramid fiber composite, etc.), or a combination thereof. The bottom skin material may be the same as or different than the top skin material. Referring to FIG. 2, the bottom skin 24 has a vertical thickness 32, which extends vertically between opposing second skin top and bottom side surfaces. This vertical thickness 32 may be substantially equal to or different (e.g., greater or less) than the vertical thickness 28 of the top skin 22.

Referring to FIG. 1 (see also FIGS. 2-4), the cellular core 26 extends longitudinally and laterally along the x-y plane. Referring again to FIG. 2, the cellular core 26 has a vertical thickness 34, which extends vertically between opposing core sides respectively abutted against the top skin 22 and the bottom skin 24. The vertical thickness 34 may be substantially greater than the vertical thickness 28, 32 of the top skin 22 and/or the bottom skin 24. The vertical thickness 34 of the core 26, for example, may be at least ten to forty times (10-40×), or more, greater than the vertical thickness 28, 32 of the skin 22, 24; however, the structured panel 20 of the present disclosure is not limited to such an exemplary embodiment.

Figure 3:
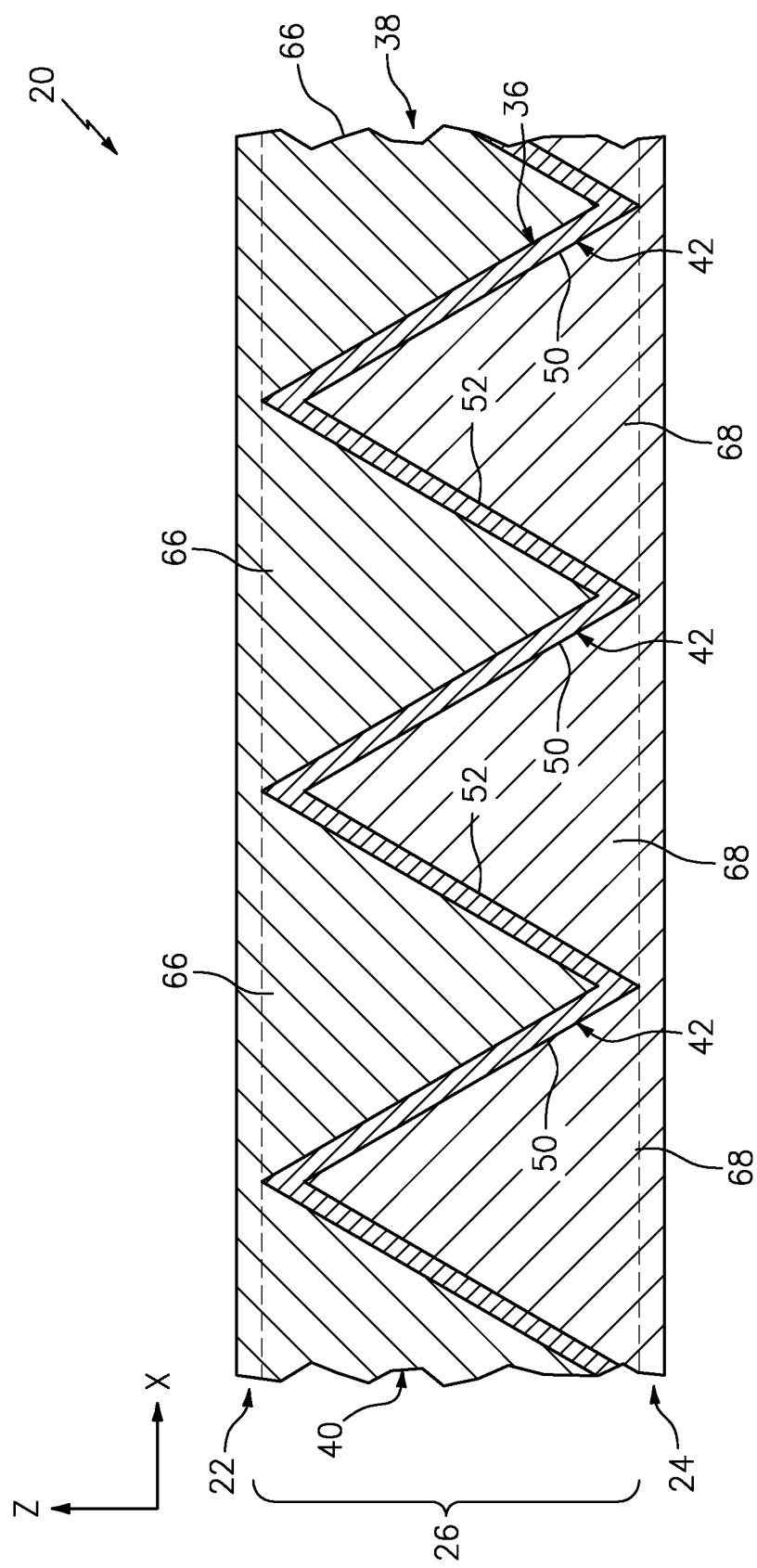
FIG. 3 is a sectional illustration of the structured panel portion of FIG. 1 along line 3-3, in accordance with various embodiments.
Figure 4:
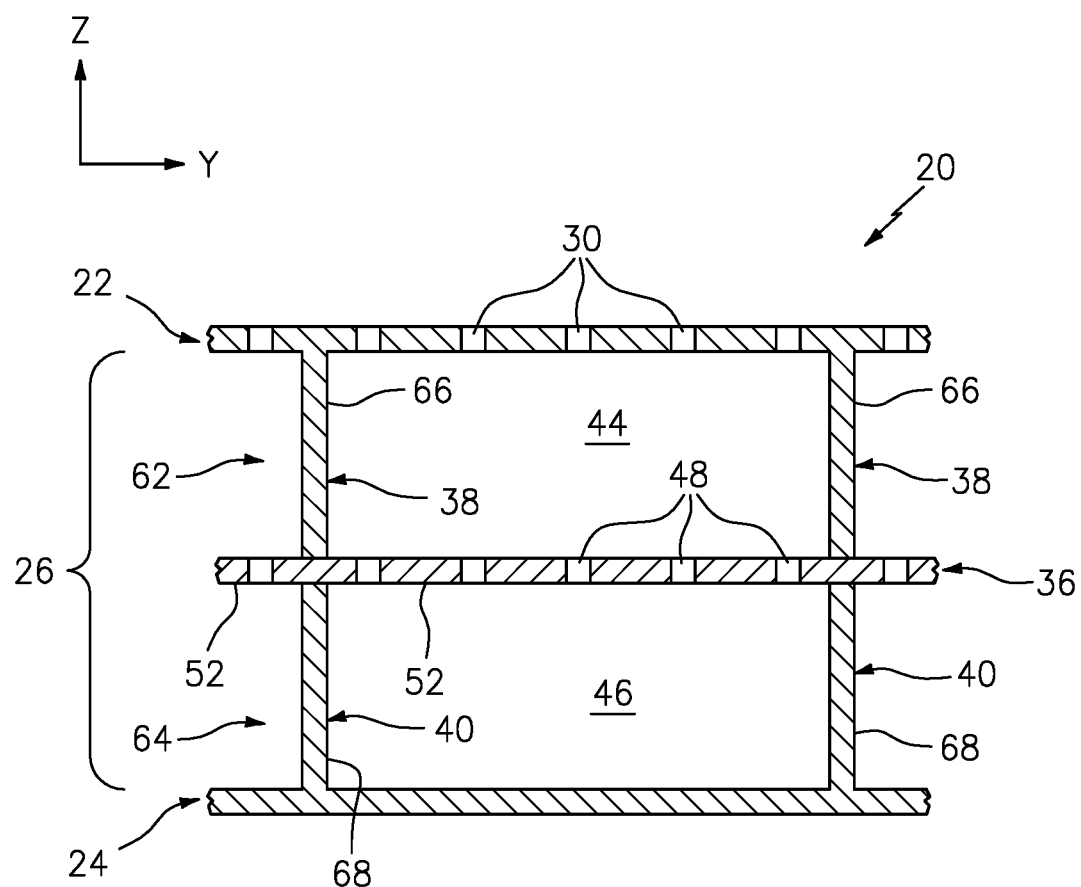
FIG. 4 is a sectional illustration of the structured panel portion of FIG. 1 along line 4-4, in accordance with various embodiments.

Referring to FIG. 1, the cellular core 26 includes a corrugated body 36, one or more top sidewalls 38 and one or more bottom sidewalls 40, where the top sidewalls 38 and the bottom sidewalls 40 are arranged on opposing sides of the corrugated body 36. More particularly, referring to FIG. 3, the top sidewalls 38 are disposed vertically between the corrugated body 36 and the top skin 22. The bottom sidewalls 40 are disposed vertically between the corrugated body 36 and the bottom skin 24. Each of the bottom sidewalls 40 is also aligned longitudinally with a respective one of the top sidewalls 38 as seen in FIG. 4; however, in other embodiments, one or more of the top sidewalls 38 may be longitudinally offset from a respective closest bottom sidewall 40. Furthermore, while structured panel 20 is illustrated with a 1:1 ratio of the top sidewalls 38 to the bottom sidewalls 40, the number of top sidewalls 38 may be different (e.g., greater or less) than the number of bottom sidewalls 40 in other embodiments. In still other embodiments, the structured panel 20 may be configured without any top sidewalls 38 or without any bottom sidewalls 40.

Figure 5:
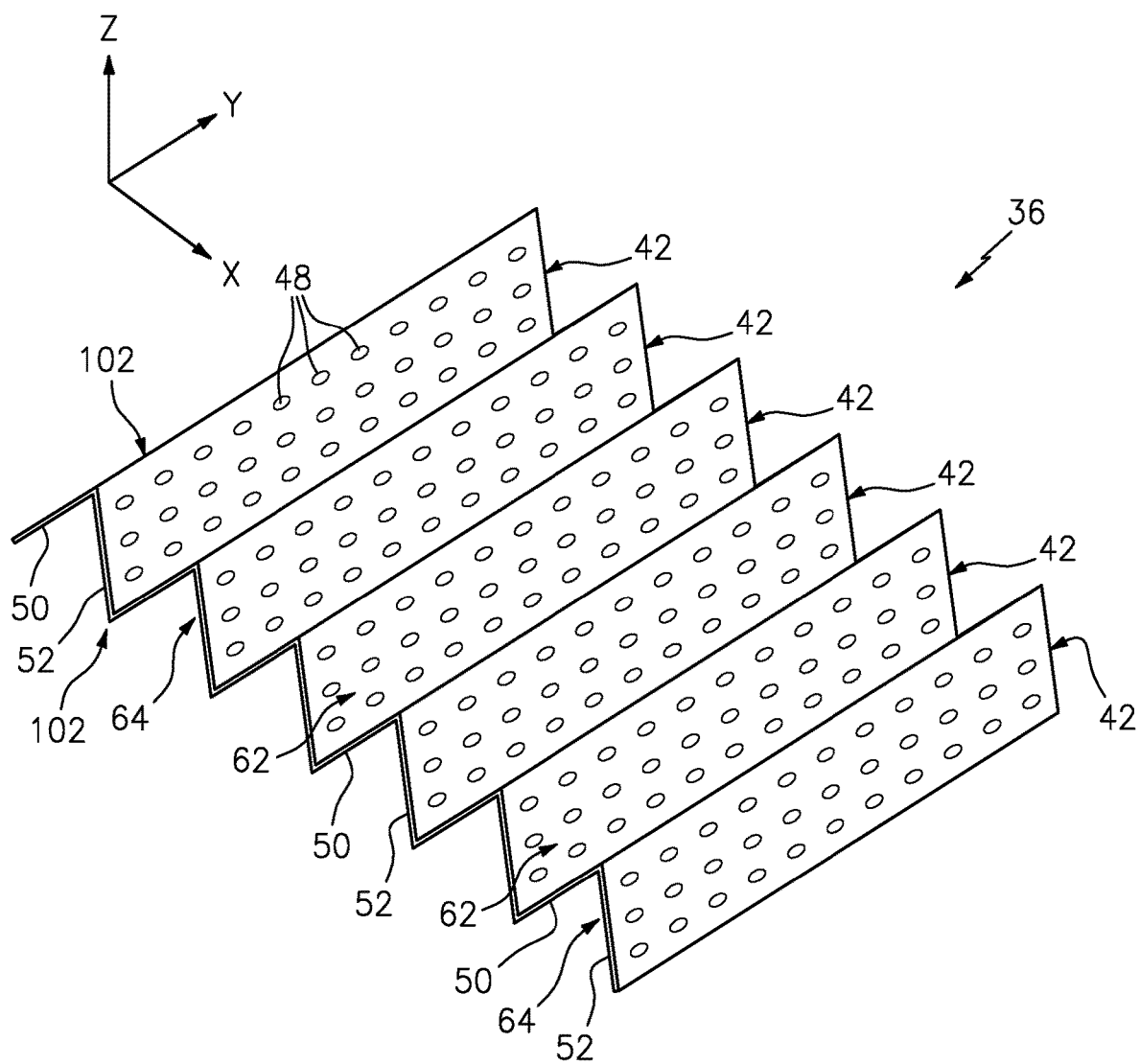
FIG. 5 is a perspective illustration of a portion of a corrugated body for the structured panel of FIG. 1, in accordance with various embodiments.

Referring to FIG. 5, the corrugated body 36 includes a plurality of corrugations 42. These corrugations 42 along with the top sidewalls 38 and the bottom sidewalls 40 are arranged together to configure the cellular core 26 as an open cavity (e.g., open cell) structure as shown in FIG. 1. Referring to FIGS. 2 and 4, this open cavity structure forms a plurality of cavities 44 and 46. The top cavities 44 are vertically between the corrugated body 36 and the top skin 22. Each of these top cavities 44 may be fluidly coupled with one or more respective passages 30 in the top skin 22. The bottom cavities 46 are vertically between the corrugated body 36 and the bottom skin 24. Each of these bottom cavities 46 may be fluidly coupled with a respective one of the top cavities 44 through one or more passages 48 (e.g., perforations) in the corrugated body 36.

Referring to FIG. 5, the corrugations 42 are arranged in a laterally extending array. This arrangement provides the corrugated body 36 with an accordion wall structure. More particularly, the corrugations 42 are configured from at least a plurality of solid (e.g., non-perforated) baffles 50 and a plurality of porous septums 52 (e.g., perforated septums; passaged shown in FIG. 2). However, in other (e.g., non-sound attenuating) embodiments, one or more or each of the septums 52 may be replaced with a solid panel similar to the baffles 50.

Referring to FIG. 2, each of the baffles 50 may be configured as a solid, continuous and/or uninterrupted panel of core material. Each of the septums 52 may be configured as a panel of core material with one or more passages 48; e.g., perforation such as through-holes. While these passages 48 are described and illustrated in FIG. 2 as through-holes for ease of description, one or more of the passages may also or alternatively be formed by one or more interconnected pores in the septum material.

Each corrugation 42 includes a respective one of the baffles 50 and a respective one of the septums 52. Each of these corrugation portions 50, 52 may extend longitudinally along an entire longitudinal length of the respective corrugation 42 as shown in FIG. 5; however, the present disclosure is not limited to such a configuration.

Referring to FIG. 2, each baffle 50 extends laterally and/or vertically (e.g., diagonally) from its top end 54 to its bottom end 56. The top end 54 of the baffle 50 is connected to and adjacent the top skin 22. The bottom end 56 of the baffle 50 is connected to and adjacent the bottom skin 24. The bottom end 56 of the baffle 50 is also connected to and contiguous with a bottom end 58 of a respective septum 54 in the same corrugation 42. This septum 52 extends from the bottom end 58 to its top end 60. The bottom end 58 of the septum 52 is connected to and adjacent the bottom skin 24. The top end 60 of the septum 52 is connected to and adjacent the top skin 22. The top end 60 of the septum 52 may also be connected to and contiguous with the top end 54 of a baffle 50 in a laterally adjacent one of the corrugations 42.

Referring to FIG. 5, each corrugation 42 forms a top channel 62 within the corrugated body 36. This top channel 62 extends laterally between the baffle 50 and the septum 52 of the corrugation 42. The top channel 62 extends vertically into the corrugated body 36 to the interface/connection between the baffle 50 and the septum 52. The top channel 62 may also extend longitudinally along the entire longitudinal length of the corrugation 42.

Each laterally adjacent pair of the corrugations 42 form a bottom channel 64 within the corrugated body 36. The bottom channel 64 extends laterally between the septum 52 of a first of the adjacent corrugations 42 to the baffle 50 of a second of the adjacent corrugations 42. The bottom channel 64 extends vertically into the corrugated body 36 to the interface/connection between the respective baffle 50 and septum 52. The bottom channel 64 may also extend longitudinally along the entire longitudinal lengths of the laterally adjacent corrugations 42. The top channels 62 and the bottom channels 64 are positioned on opposing sides of the corrugated body 36.

Referring to FIGS. 1 and 4, the top sidewalls 38 are discretely spaced longitudinally along the top channels 62 and the corrugations 42. Referring now to FIGS. 1 and 3, each top sidewall 38 extends laterally across one or more of the top channels 62 and the corrugations 42. For example, each top sidewall 38 includes one or more top sidewall elements 66 (e.g., triangular panels) arranged in a laterally extending array.

Each top sidewall element 66 is configured with a shape that substantially matches a cross-sectional shape of a respective one of the top channels 62. Each top sidewall element 66 is disposed within a respective one of the top channels 62 and configured to substantially fluidly isolate longitudinally adjacent portions (i.e., cavities 44) of that top channel 62 from one another. More particularly, the top sidewall element 66 extends laterally across the top channel 62 between the respective baffle 50 and the respective septum 52. The top sidewall element 66 extends vertically into the top channel 62 from the top skin 22 to the interface/connection between the respective baffle 50 and septum 52. The top sidewall element 66 is connected to (e.g., formed integral with) the top skin 22. The top sidewall element 66 is also connected to (e.g., adhered and/or otherwise bonded) to the respective baffle 50 and septum 52.

Referring to FIGS. 1 and 4, the bottom sidewalls 40 are discretely spaced longitudinally along the bottom channels 64 and the corrugations 42. Referring now to FIGS. 1 and 3, each bottom sidewall 40 extends laterally across one or more of the bottom channels 64 and the corrugations 42. For example, each bottom sidewall 40 includes one or more bottom sidewall elements 68 (e.g., triangular panels) arranged in a laterally extending array.

Each bottom sidewall element 68 is configured with a shape that substantially matches a cross-sectional shape of a respective one of the bottom channels 64. Each bottom sidewall element 68 is disposed within a respective one of the bottom channels 64 and configured to substantially fluidly isolate longitudinally adjacent portions (i.e., cavities 46) of that bottom channel 64 from one another. More particularly, the bottom sidewall element 68 extends laterally across the bottom channel 64 between the respective baffle 50 and the respective septum 52. The bottom sidewall element 68 extends vertically into the bottom channel 64 from the bottom skin 24 to the interface/connection between the respective baffle 50 and septum 52. The bottom sidewall element 68 is connected to (e.g., formed integral with) the bottom skin 24. The bottom sidewall element 68 is also connected to (e.g., adhered and/or otherwise bonded) to the respective baffle 50 and septum 52.

Figure 6:
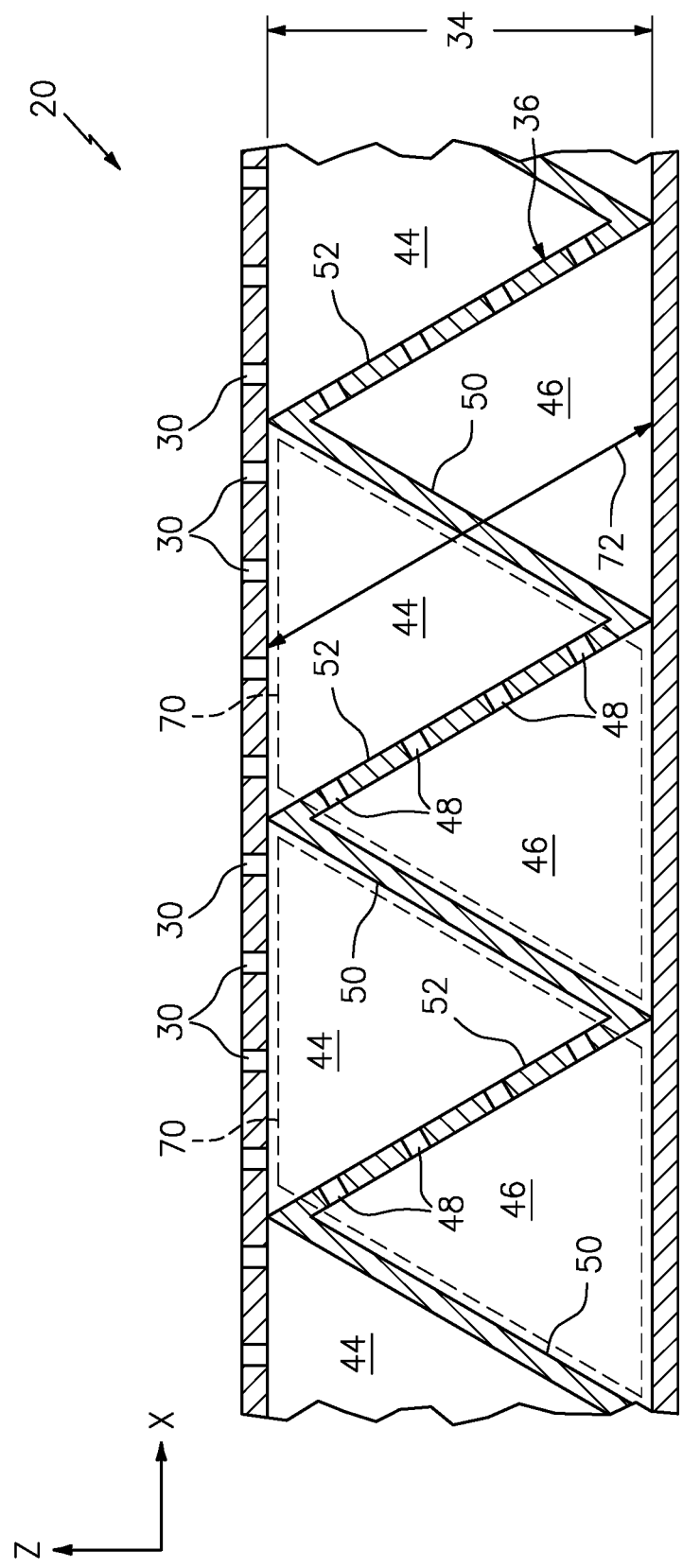
FIG. 6 is another sectional illustration of the structured panel portion of FIG. 2, in accordance with various embodiments.
Figure 7:
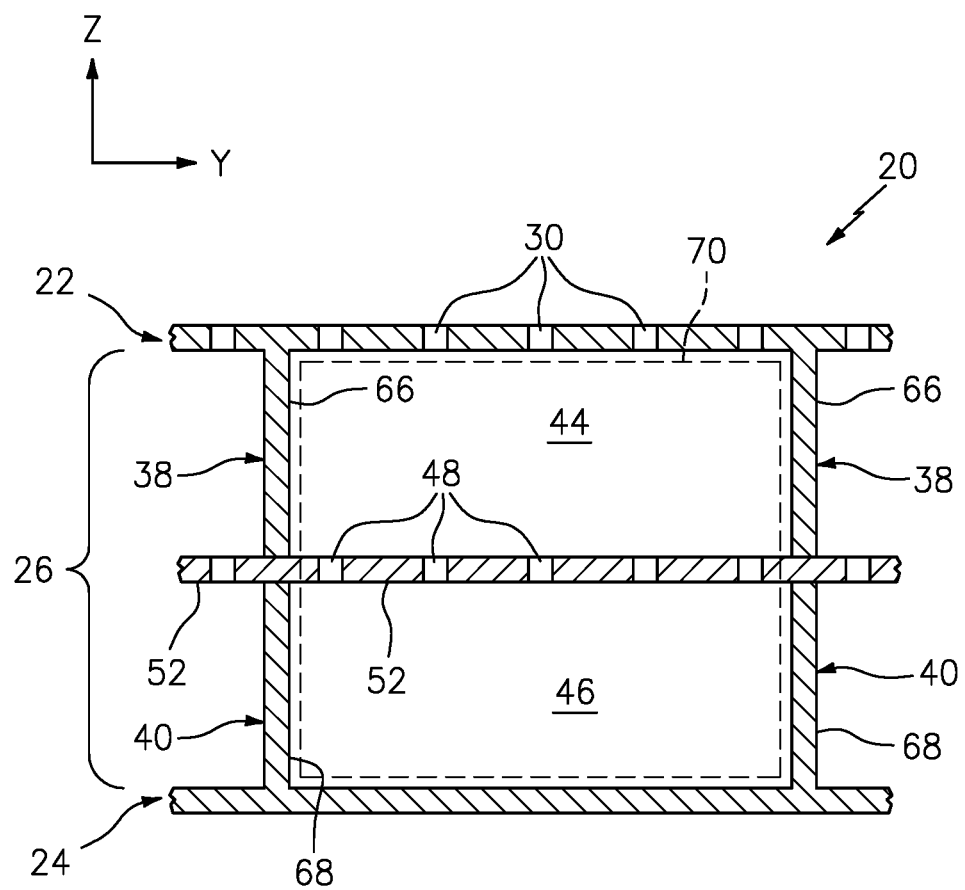
FIG. 7 is another sectional illustration of the structured panel portion of FIG. 4, in accordance with various embodiments.

Referring to FIGS. 6 and 7, the structured panel 20 includes a plurality of resonance chambers 70. Each resonance chamber 70 includes a respective one of the top cavities 44 and a respective one of the bottom cavities 46. Each resonance chamber 70 extends laterally between and is formed by a laterally adjacent pair of the baffles 50. Each of the resonance chambers 70 extends vertically between the top skin 22 and the bottom skin 24. Each of the resonance chambers 70 extends longitudinally between a laterally adjacent pair of the top sidewalls 38 and a laterally adjacent pair of the bottom sidewalls 40. Each septum 52 is disposed within and divides a respective one of the resonance chambers 70 into fluidly coupled sub-chambers. More particularly, the passages 48 (e.g., perforations) in the septum 52 fluidly couple the sub-chambers (i.e., the top and bottom cavities 44 and 46) together.

A length of each resonance chamber 70 extends diagonally between the top skin 22 and the bottom skin 24 and through a respective one of the septums 52. The length 72 of the resonance chamber 70 therefore is longer than the vertical thickness 34 of the cellular core 26. This enables noise attenuation of relatively low frequency noise without increasing the vertical thickness 34 of the core 26 and, thus, a vertical thickness of the structured panel 20. For example, each resonance chamber 70 may receive acoustic waves through the passages 30 in the top skin 22. The resonance chamber 70 may reverse the phase of one or more frequencies of those sound waves using known acoustic reflection principles and subsequently direct the reverse phase sound waves out of the structured panel 20 through the passages 30 to destructively interfere with other incoming acoustic waves.

The corrugated body 36 may be constructed from any suitable material or materials. The corrugated body 36, for example, may be constructed from a metal (e.g., sheet metal such as aluminum or titanium sheet metal), a polymer (e.g., thermoplastic or thermoset material), a fiber reinforced composite (e.g., fiberglass composite, carbon fiber composite, aramid fiber composite, etc.), or a combination thereof. The corrugated body 36 may be constructed from the same material(s) as the top skin 22 and/or the bottom skin 24, or a different material or materials.

Figure 8:
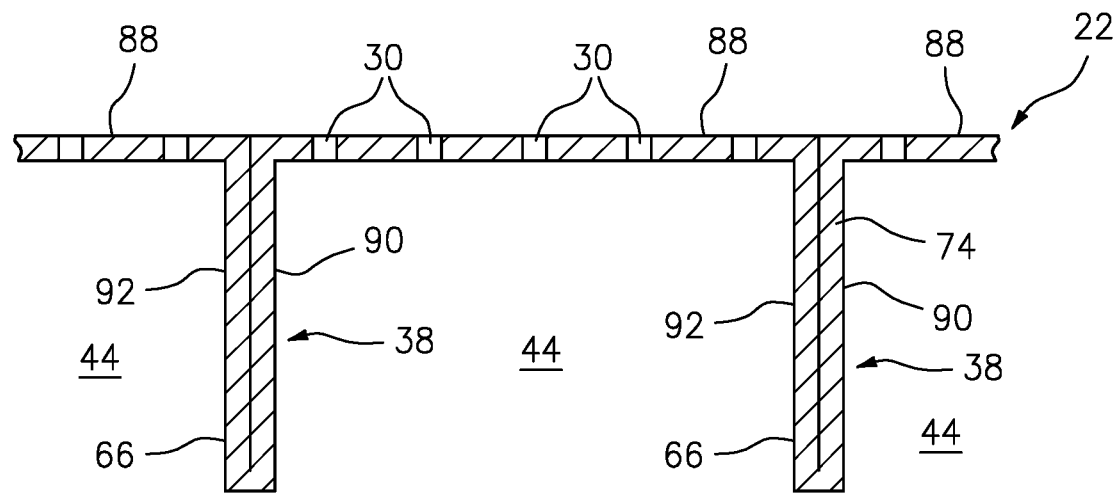
FIG. 8 is a sectional illustration of a portion of a structure for the structured panel of FIG. 1 including a top skin and a plurality of top sidewalls, in accordance with various embodiments.
Figure 9:
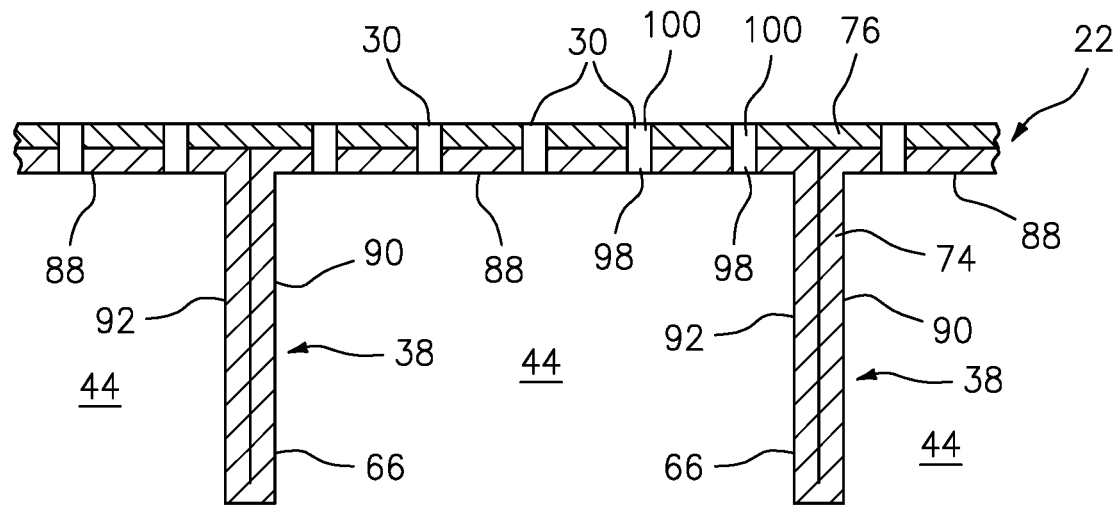
FIG. 9 is a sectional illustration of a portion of another structure for the structured panel of FIG. 1 including the top skin and the top sidewalls, in accordance with various embodiments.

The top and the bottom sidewalls 38 and 40 may be constructed from any suitable material or materials. Each sidewall 38, 40, for example, may be constructed from a metal (e.g., sheet metal such as aluminum or titanium sheet metal, or woven metallic wire), a polymer (e.g., thermoplastic or thermoset material), a fiber reinforced composite (e.g., fiberglass composite, carbon fiber composite, aramid fiber composite, etc.), or a combination thereof. Each sidewall 38, 40 is constructed from the same material(s) as a respective skin 22, 24. In the embodiments of FIGS. 8 and 9, for example, the top sidewalls 38 are formed integral with the top skin 22. Similarly, in the embodiments of FIGS. 10 and 11, the bottom sidewalls 40 are formed integral with the bottom skin 24. Each sidewall 38, 40 may be constructed from the same material(s) as the corrugated body 36; however, in other embodiments, the sidewalls 38 and/or 40 may be constructed from different material(s) than the corrugated body 36.

Referring to FIG. 8, at least a portion (or an entirety) of the top skin 22 and one or more (or each) of the top sidewalls 38 are collectively at least partially (or completely) formed by a single ply 74 (e.g., sheet, layer) of material such as, but not limited to, a single piece of sheet metal, a single layer of fibrous material in resin (e.g., thermoplastic or thermoset) matrix, a single sheet of polymer (e.g., thermoplastic or thermoset material), etc. In the embodiment of FIG. 8, the top skin 22 has a single layer construction whereas each of the sidewalls 38 has a double layer construction due to overlapping portions of the ply 74 of material. However, in other embodiments for example as shown in FIG. 9, the top skin 22 may have a multi-layer construction where, for example, the top skin 22 includes at least one additional ply 76 of material.

Figure 10:
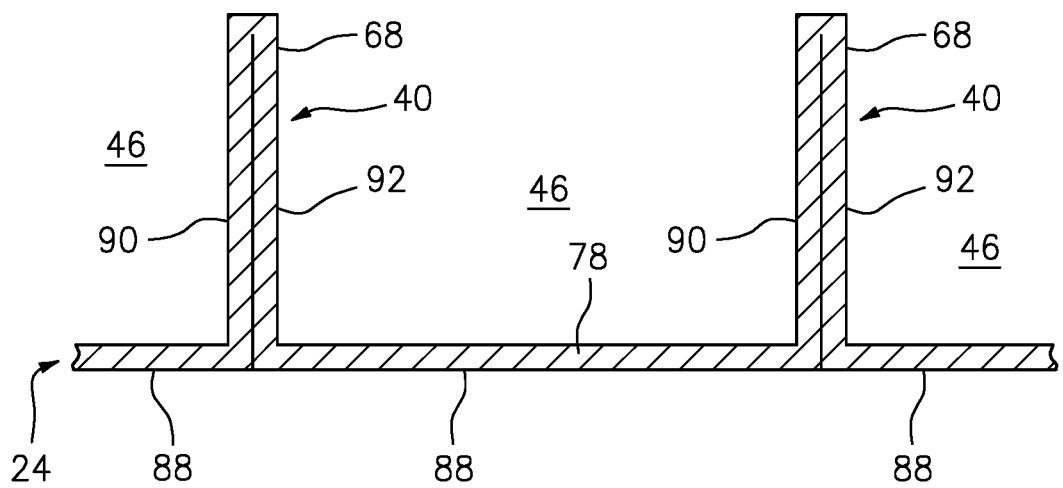
FIG. 10 is a sectional illustration of a portion of a structure for the structured panel of FIG. 1 including a bottom skin and a plurality of bottom sidewalls, in accordance with various embodiments.
Figure 11:
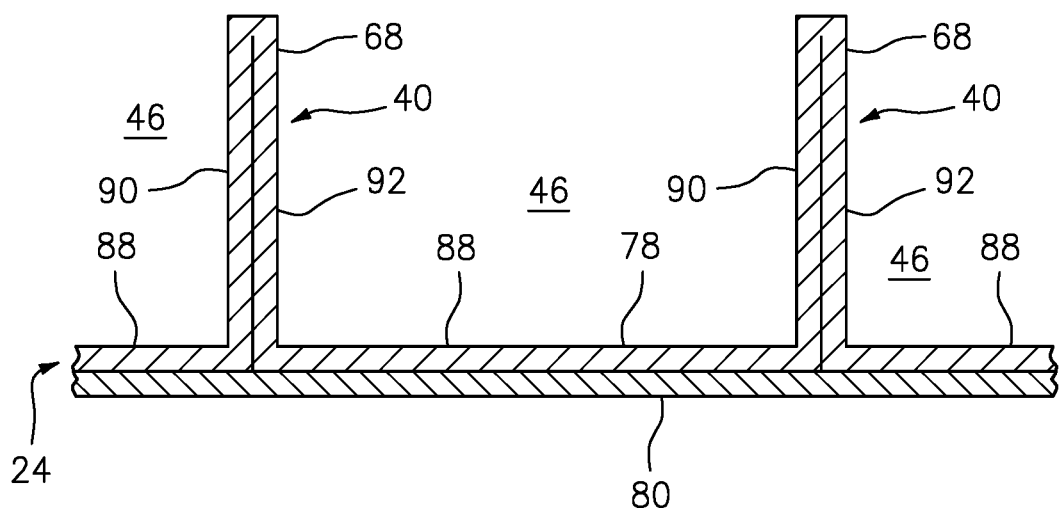
FIG. 11 is a sectional illustration of a portion of another structure for the structured panel of FIG. 1 including the bottom skin and the bottom sidewalls, in accordance with various embodiments.

Referring to FIG. 10, at least a portion (or an entirety) of the bottom skin 24 and one or more (or each) of the bottom sidewalls 40 are similarly collectively at least partially (or completely) formed by a single ply 78 (e.g., sheet, layer) of material such as, but not limited to, a single piece of sheet metal, a single layer of fibrous material in resin (e.g., thermoplastic or thermoset) matrix, a single sheet of polymer (e.g., thermoplastic or thermoset material), etc. In the embodiment of FIG. 10, the bottom skin 24 has a single layer construction whereas each of the sidewalls 40 has a double layer construction due to overlapping portions of the ply 78 of material. However, in other embodiments for example as shown in FIG. 11, the bottom skin 24 may have a multi-layer construction where, for example, the bottom skin 24 includes at least one additional ply 80 of material.

Figure 12:
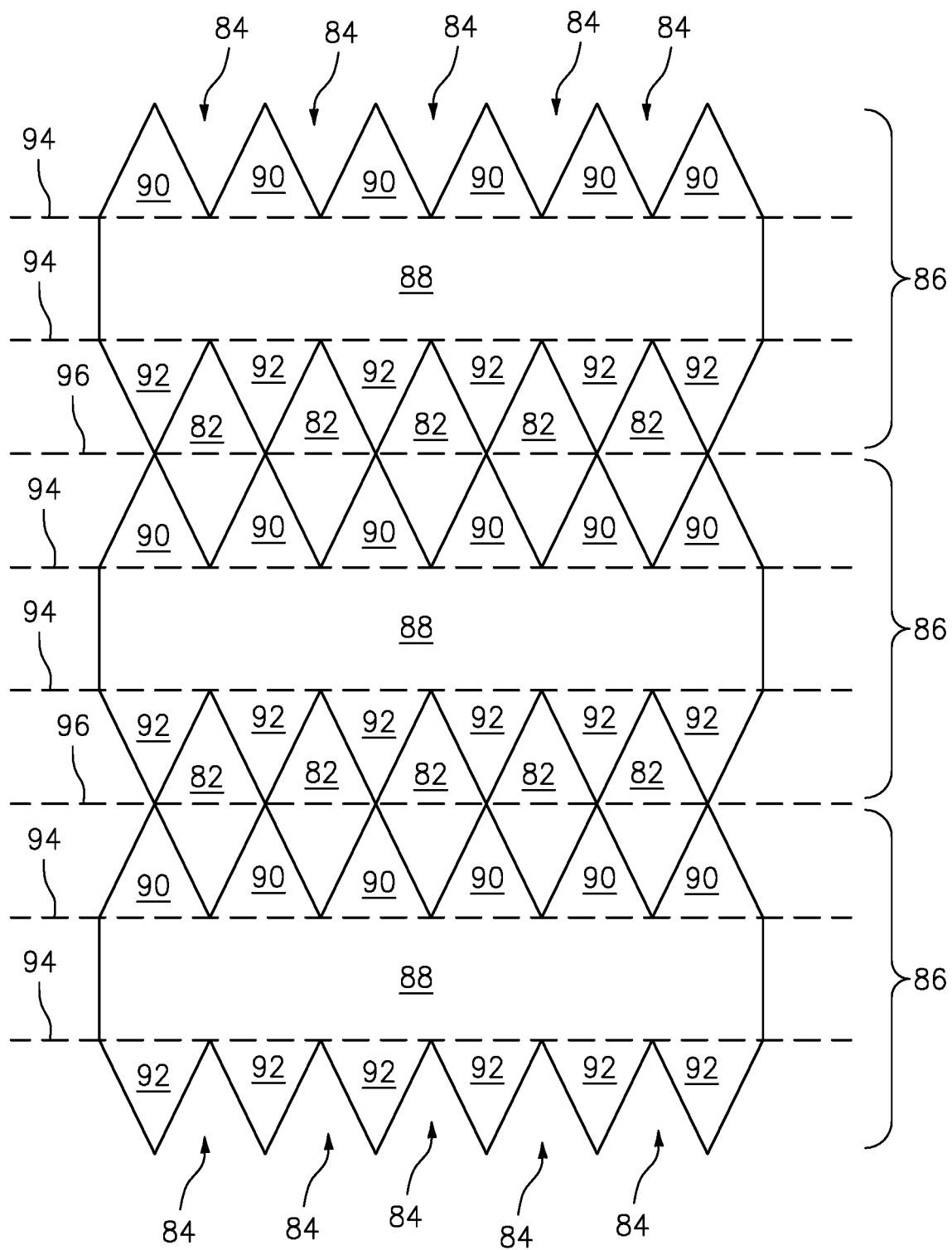
FIG. 12 is a plan view of a patterned sheet of material with dashed fold lines.

To at least partially form a respective skin 22, 24 and sidewalls 38, 40 from a ply (e.g., 74, 78) of material as described above, a full sheet of material (e.g., an unmanipulated, stock sheet of material) may be patterned as shown, for example, in FIG. 12. In particular, a plurality of cutouts 82 and 84 are formed in a full sheet of material to provide the patterned sheet of material. In the embodiment of FIG. 12, the cutouts 82 are polygonal-shaped (e.g., diamond shaped) and arranged in one or more lateral arrays. The cutouts 84 are also polygonal-shaped (e.g., triangular shaped) and arranged in one or more lateral arrays. The cutouts 82 and 84 provide the patterned sheet of material of FIG. 12 with one or more segments 86; e.g., integral portions. Each of these segments 86 includes a (e.g., rectangular) base 88, a plurality of first (e.g., triangular or otherwise polygonal) projections 90 and a plurality of second (e.g., triangular or otherwise polygonal) projections 92. The base 88 is disposed between the first and the second projections 92 such that the first projections 90 are on a first side of the base 88 and the second projections 92 are on a second, opposite side of the base 88. Distal ends (e.g., peaks) of the first projections 90 are respectively connected to distal ends (e.g., peaks) of the second projections 92 of an adjacent segment, and vice versa.

After the patterning, the patterned sheet of material is folded along the fold lines 94 and 96. The fold lines 94 correspond to folds in a first direction. The fold lines 96 correspond to folds in a second, opposite direction. After the folding, each base 88 forms a portion of a respective skin 22, 24; e.g., see FIGS. 8-11. Each folded over and overlapping pair of projections 90 and 92 forms a respective sidewall element 66, 68; e.g., see FIGS. 8-11

After the folding and the provision of at least two of the folded and patterned sheets of material, these folded and patterned sheets of material are attached (e.g., bonded) to opposing sides of the corrugated body 36 to form the structured panel 20. Of course, additional sheets of material may be attached to the structure to provide, for example, multi-layer skins as shown, for example, in FIGS. 9 and 11.

In some embodiments, the base 88 of the patterned material for the top skin 22 may be perforated prior to the folding. In other embodiments, the top skin 22 may be perforated after the folded and patterned sheet of material is attached to the corrugated body 36.

Figure 13:
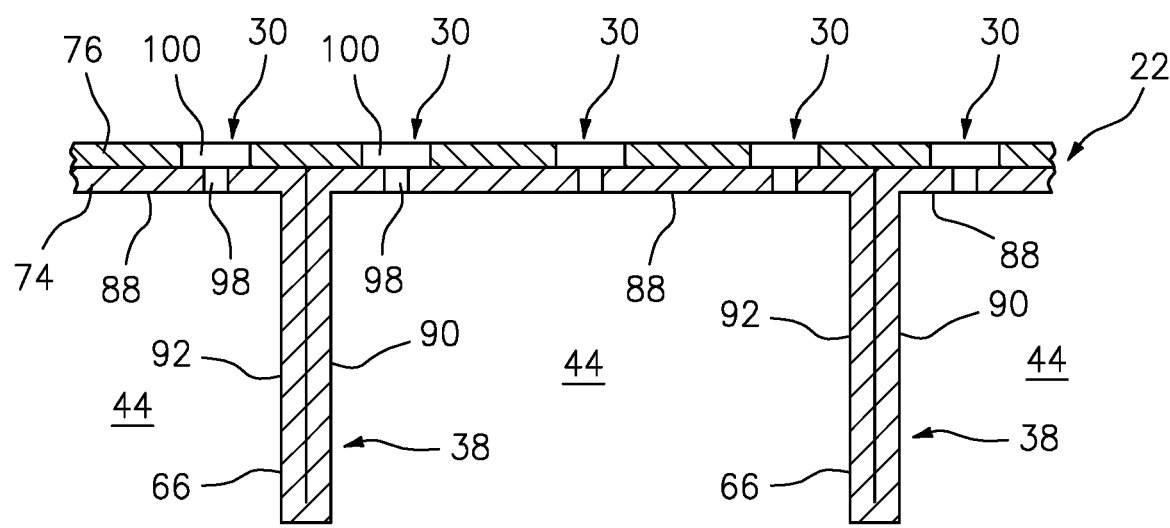
FIG. 13 is a sectional illustration of a portion of still another structure for the structured panel of FIG. 1 including the top skin and the top sidewalls, in accordance with various embodiments.

Referring to FIG. 9, in some embodiments, the ply 74 of material includes a plurality of first apertures 98 (e.g., through-holes) and the ply 76 of material includes a plurality of second apertures 100 (e.g., through-holes), which are respectively laterally and longitudinally aligned with the first apertures 98. Each first aperture 98 may have a first aperture width (e.g., diameter) that is substantially (e.g., +/−5%) or exactly equal to a second aperture width (e.g., diameter) of a respective aligned second aperture 100. However, in other embodiments, the second aperture width may be sized different (e.g., greater) than the first aperture width as shown, for example, in FIG. 13.

Figure 14:
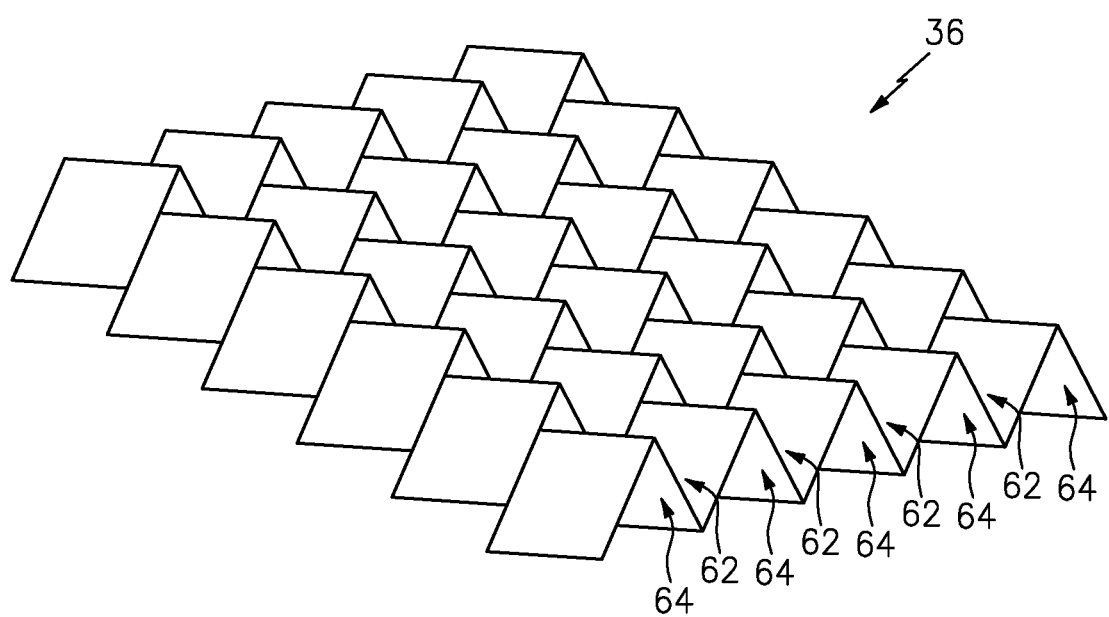
FIG. 14 is a perspective illustration of a portion of another corrugated body for the structured panel of FIG. 1, in accordance with various embodiments.

FIG. 14 illustrates another embodiment of the corrugated body 36 for the structured panel 20. This corrugated body 36 is configured with non-linear (e.g., zig-zagging) first and second channels 62 and 64.

In some embodiments, referring to FIG. 5, an upper or lower peak 102 between a respective pair of baffle 50 and septum 52 may be sharp. In other embodiments, referring to FIG. 15, one or more of the peaks 102 may be blunt; e.g., curved.

Figure 15:
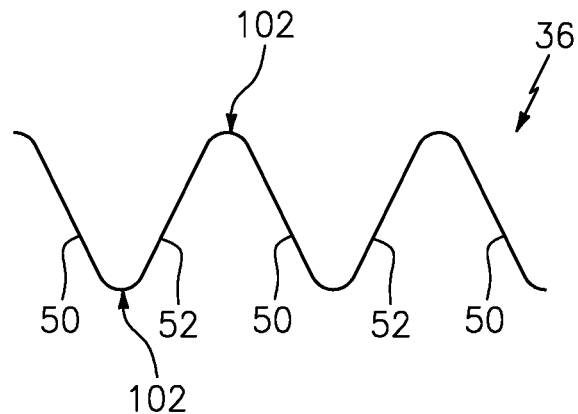
FIG. 15 is a side schematic illustration of a portion of another corrugated body for the structured panel of FIG. 1, in accordance with various embodiments.
Figure 16:
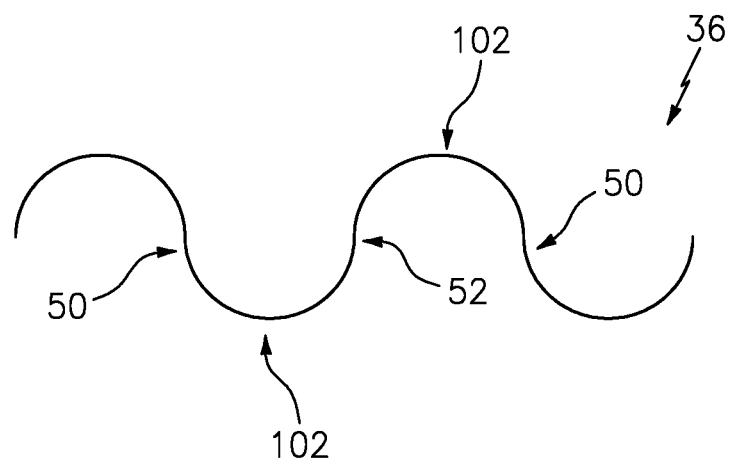
FIG. 16 is a side schematic illustration of a portion of still another corrugated body for the structured panel of FIG. 1, in accordance with various embodiments.

In some embodiments, each baffle 50 and/or each septum 52 may follow a substantially flat, linear trajectory as illustrated in FIG. 15; see also FIG. 5. In other embodiments, each baffle 50 and/or each septum 52 may follow a curved (e.g., sinusoidal) trajectory as illustrated in FIG. 16.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A panel for attenuating sound, comprising:
a first skin, a second skin and a core between and connected to the first skin and the second skin, the core including a corrugated body, a first sidewall and a second sidewall;
the corrugated body including a plurality of corrugations configured from at least a plurality of baffles and a plurality of septums, each of the corrugations including a respective one of the baffles and a respective one of the septums;
wherein a first cavity extends laterally within the core from a first of the baffles to a first of the septums, the first cavity extends longitudinally within the core from the first sidewall to the second sidewall, and the first cavity is fluidly coupled with a passage through a first portion of the first skin; and
wherein the first portion of the first skin, the first sidewall and the second sidewall are collectively at least partially formed by a ply of material.

2. The panel of claim 1, wherein the ply of material comprises thermoplastic material.

3. The panel of claim 1, wherein the ply of material comprises thermoset material.

4. The panel of claim 1, wherein the ply of material comprises metal.

5. The panel of claim 1, wherein the first portion of the first skin is further partially formed by a second ply of material that overlaps and is bonded to the ply of material.

6. The panel of claim 5, wherein
the ply of material is configured with a first through hole;
the second ply of material is configured with a second through hole having a width that is greater than a width of the first through hole; and
the passage is formed by at least the first through hole and the second through hole.

7. The panel of claim 1, wherein
the core further includes a third sidewall;
a second cavity extends laterally within the core from a second of the baffles to a second of the septums, the second cavity extends longitudinally within the core from the first sidewall to the third sidewall, and the second cavity is fluidly coupled with a second passage through a second portion of the first skin; and
the first portion of the first skin, the second portion of the first skin, the first sidewall, the second sidewall and the third sidewall are collectively at least partially formed by the ply of material.

8. The panel of claim 1, wherein
a second cavity extends laterally within the core from a second of the baffles to a second of the septums, the second cavity extends longitudinally within the core from the first sidewall to the second sidewall, and the second cavity is fluidly coupled with a second passage through a second portion of the first skin; and
the first portion of the first skin, the second portion of the first skin, the first sidewall and the second sidewall are collectively at least partially formed by the ply of material.

9. The panel of claim 1, wherein
the core further includes a third sidewall and a fourth sidewall;
the corrugated body is between the first sidewall and the third sidewall and between the second sidewall and the fourth sidewall; and
a second cavity extends laterally within the core from the first of the septums to a second of the baffles, the second cavity extends longitudinally within the core from the third sidewall to the fourth sidewall, and the second cavity is fluidly coupled with the first cavity through one or more perforations in the first of the septums.

10. The panel of claim 9, wherein a first portion of the second skin bounding the second cavity, the third sidewall and the fourth sidewall are collectively at least partially formed by a second ply of material.

11. The panel of claim 9, wherein
the third sidewall is longitudinally aligned with the first sidewall; and
the fourth sidewall is longitudinally aligned with the second sidewall.

12. The panel of claim 1, wherein the first sidewall and the second sidewall each extend from the first skin to the first of the baffles and the first of the septums.

13. The panel of claim 1, wherein a first portion of the ply of material overlaps and is bonded to a second portion of the ply of material to form at least a portion of the first sidewall.

14. The panel of claim 13, wherein a third portion of the ply of material overlaps and is bonded to a fourth portion of the ply of material to form at least a portion of the second sidewall.

15. The panel of claim 1, wherein, prior to formation of the panel, the ply of material comprises a sheet of material with one or more rows of polygonal-shaped cutouts.

16. The panel of claim 1, wherein
the ply of material comprises a plurality of segments;
each of the segments comprises
a rectangular base,
a plurality of first triangular projections on a first side of the rectangular base; and
a plurality of second triangular projections on a second side of the rectangular base; and
peaks of the first triangular projections of a first of the segments are respectively connected to peaks of the second triangular projections of a second of the segments.

17. A structured panel, comprising:
a first skin, a second skin and a core between and connected to the first skin and the second skin, the core including a corrugated body, a first sidewall, a second sidewall and a third sidewall;
the corrugated body including a plurality of corrugations configured from at least a plurality of baffles and a plurality of septums, each of the corrugations including a respective one of the baffles and a respective one of the porous septums;
wherein a first cavity extends laterally within the core from a first of the baffles to a first of the septums, the first cavity extends longitudinally within the core from the first sidewall to the second sidewall;
wherein a second cavity extends laterally within the core from a second of the baffles to a second of the septums, the second cavity extends longitudinally within the core from the second sidewall to the third sidewall; and
wherein a first portion of the first skin adjacent the first cavity, a second portion of the first skin adjacent the second cavity, the first sidewall, the second sidewall and the third sidewall are collectively at least partially formed by a ply of material.

18. The structured panel of claim 17, wherein
the first cavity is fluidly coupled with a first passage through the first portion of the first skin; and
the second cavity is fluid coupled with a second passage through the second portion of the first skin.

19. The structured panel of claim 17, wherein the first skin is a non-perforated skin.

20. A method comprising forming a panel for attenuating sound, the panel comprising a porous first skin, a second skin and a cellular core connected to and between the porous first skin and the second skin, wherein the cellular core is configured with a first cavity that extends laterally between a baffle and a porous septum and longitudinally between a first sidewall and a second sidewall, wherein the forming comprises:
providing a sheet of material with one or more rows of polygonal cutouts; and
folding the sheet of material such that a portion of the porous first skin bounding the first cavity, the first sidewall and the second sidewall are collectively at least partially defined by the folded sheet of material.

* * * * *